United States Patent
Johnson et al.

(10) Patent No.: US 9,028,354 B2
(45) Date of Patent: May 12, 2015

(54) HYDRAULIC REGENERATION APPARATUS

(71) Applicants: Daniel S. Johnson, Loveland, CO (US); D. Jude Hueber, Jr., Fort Collins, CO (US); Jonathan L. Reynolds, Fort Collins, CO (US)

(72) Inventors: Daniel S. Johnson, Loveland, CO (US); D. Jude Hueber, Jr., Fort Collins, CO (US); Jonathan L. Reynolds, Fort Collins, CO (US)

(73) Assignee: Lighting Hybrids, Loveland, CO (US)

( * ) Notice: Subject to any disclaimer, the term of this patent is extended or adjusted under 35 U.S.C. 154(b) by 261 days.

(21) Appl. No.: 13/786,414

(22) Filed: Mar. 5, 2013

(65) Prior Publication Data

US 2014/0087916 A1 Mar. 27, 2014

Related U.S. Application Data

(60) Provisional application No. 61/606,556, filed on Mar. 5, 2012.

(51) Int. Cl.
| | | |
|---|---|---|
| *F16H 47/00* | (2006.01) | |
| *F16H 47/04* | (2006.01) | |
| *B60W 10/06* | (2006.01) | |
| *B60K 6/12* | (2006.01) | |
| *B60W 10/196* | (2012.01) | |

(52) U.S. Cl.
CPC .................. *B60W 10/06* (2013.01); *B60K 6/12* (2013.01); *Y02T 10/6208* (2013.01); *B60W 10/196* (2013.01)

(58) Field of Classification Search
USPC ................ 475/72, 73, 78, 80; 477/52, 69, 68; 74/718, 665 A, 665 B
See application file for complete search history.

(56) References Cited

U.S. PATENT DOCUMENTS

| | | | |
|---|---|---|---|
| 4,464,947 A * | 8/1984 | Windsor-Smith et al. ....... | 74/329 |
| 4,805,473 A * | 2/1989 | Bower ............................ | 74/361 |
| 7,188,017 B2 | 3/2007 | Rodrigues et al. | |
| 8,277,364 B2 * | 10/2012 | Hyodo et al. .................. | 477/115 |
| 8,827,853 B2 * | 9/2014 | Carl et al. ....................... | 475/72 |
| 2004/0184923 A1 | 9/2004 | Iwanami et al. | |
| 2008/0210500 A1 | 9/2008 | Walker | |
| 2009/0036248 A1 * | 2/2009 | Mueller et al. .................. | 475/72 |
| 2009/0173066 A1 * | 7/2009 | Duray ............................. | 60/413 |
| 2010/0016119 A1 | 1/2010 | Petzold et al. | |
| 2010/0298081 A1 * | 11/2010 | Ivanysynova et al. .......... | 475/72 |
| 2011/0074204 A1 | 3/2011 | Kim | |
| 2011/0232418 A1 | 9/2011 | Gray, Jr. et al. | |

OTHER PUBLICATIONS

International Search Report, International Searching Authority, May 21, 2013, pp. 1-13.

* cited by examiner

*Primary Examiner* — Gene Crawford
*Assistant Examiner* — Ryan Dodd
(74) *Attorney, Agent, or Firm* — Samuel M. Freund; Cochran Freund & Young LLC

(57) ABSTRACT

A hydraulic motor/pump regenerator system for recovering energy from the moving vehicle having high efficiency and precise control, thereby allowing the maximum amount of energy to be recovered and reused, is described. Three, fixed-displacement pump/motors are used to enable the system to recover and reapply energy at efficiencies expected to be above 70% in most circumstances. The invention is not limited to the use of three fixed displacement hydraulic units since using more units may in some drive cycles further improve efficiency. By selecting an appropriate combination of pump/motor units for providing the driveshaft torque required by the driver, embodiments of the present invention generate high recovery efficiency at any speed.

22 Claims, 4 Drawing Sheets

HYDRAULIC REGENERATION APPARATUS

CROSS-REFERENCE TO RELATED APPLICATIONS

The present application claims the benefit of U.S. Provisional Patent Application No. 61/606,556 for "Hydraulic Regeneration Apparatus" by Daniel S. Johnson et al., which was filed on Mar. 5, 2012, the entire content of which is hereby specifically incorporated by reference herein for all that it discloses and teaches.

FIELD OF THE INVENTION

The present invention relates generally to hydraulic energy regeneration and, more particularly, to the use of fixed-displacement pump/motors for recovering energy from a vehicle and using this energy to supplement the power of the principal engine to save fuel.

BACKGROUND OF THE INVENTION

Although work on improved fuel economy has expanded in recent years for all classes of vehicles with the increasing cost of fuel and energy in general, fuel consumed by trucks has been growing at a faster rate than that for passenger cars, perhaps due to the more limited availability of such technology since many trucks already use efficient diesel engines, and the weight constraints associated with these vehicles.

Typical braking systems readily turn the energy of vehicle motion into heat by means friction which slows the vehicle. Complex systems have been designed to recover some of this energy and reintroduce it into the system so that the energy is not wasted. Methods for accomplishing this include mechanical storage systems such as flywheels, electrical storage of energy in batteries, and hydro-pneumatic storage of energy by compressing a gas using hydraulic fluid. These methods generally include a transmission for extracting energy from the system and delivering it to an energy storage device. In electric systems, a transmission transfers energy from the system to an electric generator which charges a battery bank. The transmission is designed to optimize the efficiency of the charging system and accommodate its specific power density. For example, a battery bank can only accept electrical energy at a specific rate. As a practical consideration, a vehicle driver must control the vehicle for the current traffic and road conditions which are constantly changing. Thus, the optimization of energy recovery through discrete components becomes difficult and upper limits to the amount of energy that can be recovered are quickly realized. Mechanical and hydraulic recovery systems are also plagued by their discrete nature, and optimization is difficult. Energy recovery systems require a high degree of variability in their energy recovery rate while maintaining high conversion efficiencies.

With the large mass associated with trucks, the regeneration and reuse of significant amounts of braking energy in hybrid subsystems can be high, which makes hydraulic propulsion and storage components attractive for truck applications since they are characterized by higher power density when compared with their electric counterparts. That is, as an energy storage device, a hydraulic accumulator has the ability to accept high rates and high frequencies of charging/discharging, both of which as stated are not favorable for batteries. However, the relatively low energy capacity of the hydraulic accumulator requires carefully designed control strategy, so that the fuel economy potential can be realized.

Hydraulic energy recovery methods currently in practice utilize a hydraulic pump with variable displacement to move fluid from a low pressure source into a high pressure region such as a hydro-pneumatic accumulator. For conventional piston-type hydraulic pumps and motors, variable displacement is achieved by mechanically and/or hydraulically changing the stroke of the pistons. The displacement control dictates the rate at which energy is recovered or removed from the moving vehicle. Once sufficient energy is recovered from the system, the high-pressure hydraulic fluid can be used to turn a hydraulic motor and redeliver the energy to the system so that the prime mover need not generate as much power. At specific energy recovery rates (flow rates through the pump), the pump and motor can operate efficiently. However, small variations from those specific recovery rates may affect the recovery efficiency; for example, at certain displacements the pump and motor can be efficient volumetrically and mechanically, but small deviations from those conditions may cause heat generation inside of the pump and fluid loss at the low-to-high pressure interface.

SUMMARY OF THE INVENTION

Embodiments of the present invention overcome the disadvantages and limitations of the prior art by providing an energy recovery system for managing the torque to the wheels of a vehicle independent of the input power source.

Another object of embodiments of the invention is to provide an energy regeneration system for decreasing transient running conditions and avoiding load conditions for a motor vehicle that cause energy to be used inefficiently over a range of energy recovery rates.

Still another object of embodiments of the invention is to recover, store, and reapply the kinetic energy of a moving vehicle in such a way that the prime mover of the vehicle uses less energy to accelerate the vehicle.

Yet another object of embodiments of the present invention includes coordinating the operation of a primary power source and a supplemental power source, to maximize fuel economy while satisfying performance constraints.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the hydraulic regeneration apparatus for a motor vehicle having an engine, a transmission and a driveshaft, the regeneration apparatus comprising: at least two fixed displacement hydraulic pump/motors; a sun gear rotatably disposed between the transmission and the drive shaft; a first planet gear in meshing communication with the sun gear; a second planet gear in meshing communication with the sun gear; at least two hydraulic clutch members, a first hydraulic clutch member of the at least two clutch members for rotatably engaging a first of the at least two pump/motors with the first planet gear, and a second hydraulic clutch of the at least two clutch members for engaging a second of the at least two pump/motors with the second planet gear; a low-pressure hydraulic accumulator containing pressurized fluid; a high-pressure hydraulic accumulator containing pressurized fluid; a multifunction hydraulic manifold for placing said first pump/motor in fluid communication with the low-pressure accumulator and the high-pressure accumulator, and for placing the second pump/motor in fluid communication with the low-pressure accumulator and said high-pressure accumulator, for controlling the output torque of the first pump/motor and the second pump/motor to the drive shaft, and for controlling the torque absorbed by the first pump/motor and said second pump motor from the driveshaft; a vehicle throttle position sensor; a brake pedal position sensor; and an electronic control for receiving pressure information from the high-pressure accumulator and low-pressure accumulator, brake pedal position information, and throttle position information, and for controlling the multi-function hydraulic manifold.

In another aspect of the present invention, and in accordance with its objects and purposes, the hydraulic regeneration apparatus for a motor vehicle having an engine, a transmission and a driveshaft, hereof includes: at least two fixed displacement hydraulic pump/motors; a sun gear rotatably disposed between the transmission and the driveshaft; a dog clutch for mechanically isolating the sun gear from the driveshaft; a synchronizer plate for matching the speed of rotation of the sun gear to the speed of rotation of the driveshaft; a first planet gear in meshing communication with the sun gear for rotatably engaging a first of the at least two pump/motors; a second planet gear in meshing communication with the sun gear for rotatably engaging a second of the at least two pump/motors; a low-pressure hydraulic accumulator containing pressurized fluid; a high-pressure hydraulic accumulator containing pressurized fluid; a multifunction hydraulic manifold for placing the first pump/motor in fluid communication with the low-pressure accumulator and the high-pressure accumulator, and for placing the second pump/motor in fluid communication with the low-pressure accumulator and the high-pressure accumulator, for controlling the output torque of the first pump/motor and the second pump/motor to the driveshaft, and for controlling the torque absorbed by the first pump/motor and the second pump motor from said driveshaft; a vehicle throttle position sensor; a brake pedal position sensor; and an electronic control for receiving pressure information from the high-pressure accumulator and low-pressure accumulator, brake pedal position information, and throttle position information, and for controlling the multi-function hydraulic manifold.

Benefits and advantages of embodiments of the present invention include, but are not limited to, providing an apparatus and method for recovering, storing, and reapplying the kinetic energy of a moving vehicle in such a way that the prime mover of the vehicle uses less energy to accelerate the vehicle, while operating at the maximum possible efficiency over the entire range of required energy recovery rates, maximizing fuel economy, and satisfying performance constraints, such as braking and acceleration performance.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
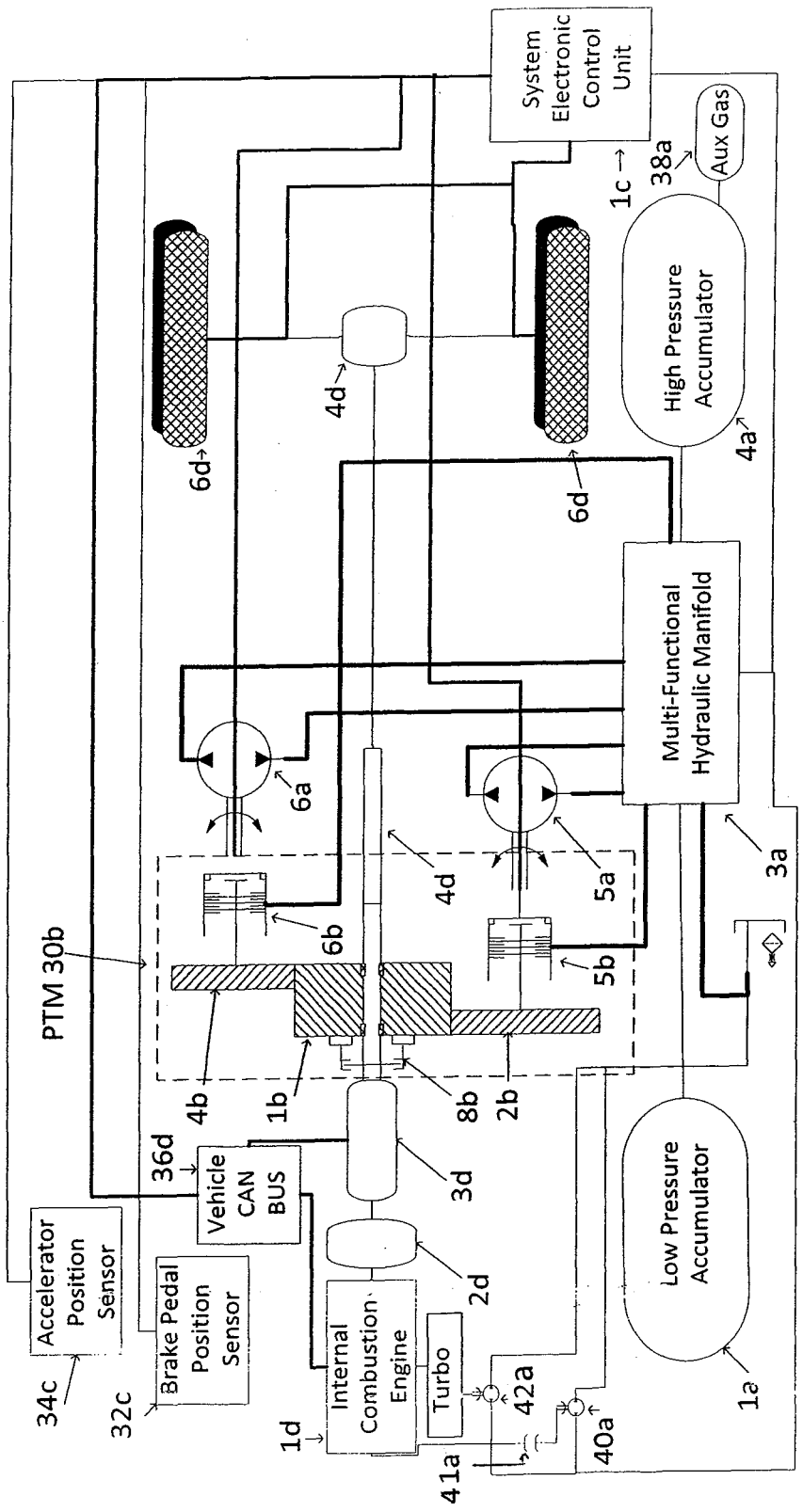
FIG. 1 is a schematic representation of an embodiment of the hydraulic regeneration apparatus of the present invention illustrating the principal components thereof in cooperation with the associated components of a vehicle.

Briefly, embodiments of the present invention include an apparatus and method for hydraulic regeneration having a wide range of applications and uses. Embodiments of the invention may precisely control shaft torque with the ability to recover energy that is typically wasted in other torque management devices. The recovered energy can be used to return torque to the system when it would otherwise have to be generated by an energy source such as an electric motor or internal combustion engine. Embodiments of the invention may be used in hybrid vehicles, and are applicable to any situation where shaft torque is to be controlled and recovery and reallocation of energy are desirable. Brake systems, infinitely variable transmissions, and shaft energy recovery, as well as applications of these devices, are included. The present hydraulic regenerator is greater than its discrete component parts such as a pump, motor and hydro-pneumatic accumulator; rather, it is an energy transfer device.

Embodiments of the present invention include coordinating the operation of a primary power source, typically an internal combustion engine, and a supplemental power source, such as two or more hydraulic motors, to maximize fuel economy while satisfying performance constraints, with the goal of allowing the apparatus to operate at approximately the same high efficiency over the entire range of required energy recovery rates. Another goal of the hydraulic regenerator is to allow secondary control of the prime mover. Whether the prime mover is an electric motor or an internal combustion engine, its efficiency may be increased by decreasing transient running conditions, and avoiding load conditions that cause energy to be used inefficiently. This is the goal of continuously variable transmissions and automatic transmissions having ever increasing numbers of ratios to allow the prime mover to operate in a limited range of speed and load.

The hydraulic components of embodiments of the present invention that allow power to be stored or released into the drive shaft of a vehicle permit other improvements to be made which will improve a vehicle's operating efficiency. One such improvement is the addition of an auxiliary hydraulic pump coupled directly to the engine of the vehicle via a clutching mechanism. With this addition, it is possible to store energy that would otherwise be wasted by the engine directly. For example, if the engine is running at low brake specific torque and higher speeds, a large amount of fuel is being used that does not propel a vehicle down the road. In this situation, the auxiliary hydraulic pump can be coupled to the engine to move fluid from the low-pressure accumulator to the high-pressure accumulator, thereby storing energy. This stored energy can then be used to power the vehicle when larger quantities of power are required. The addition of this pump also simplifies engine off operating strategies by ensuring that there is always the minimum amount of energy stored to permit the vehicle to be propelled by the hydraulic regeneration apparatus for sufficient time to permit the engine to be shut down for some amount of time, such as for a stop light or other traffic interruption.

Another improvement made possible by the presence of the hydraulic regeneration apparatus is a turbo-powered pump which can achieve the same operating goal as an engine driven pump. Waste heat from the engine spins a turbo-device which turns a pump attached thereto through a clutch device. Again the pump moves fluid from the low-pressure accumulator to the high-pressure accumulator, thereby storing energy, which can be used at various times during operation of the vehicle for any purpose that improves the overall efficiency or increases vehicle performance.

An auxiliary gas bottle, in communication with the charging port of the nitrogen bladder of the high-pressure accumulator, may also be added. The gas volume of this auxiliary bottle is supplementary to the gas volume of the nitrogen bladder within the high-pressure accumulator, thereby increasing the usable hydraulic fluid volume of the high-pressure accumulator without increasing the volume of the high-pressure accumulator itself. This feature may be useful in applications where the hydraulic regeneration device is added to vehicles having limited space.

Embodiments of the present invention are efficient at recovering kinetic energy from a vehicle and using the recovered energy to supplement the power of the prime mover to save fuel. At least two, fixed-displacement pump/motors are used to enable the system to recover and reapply energy at efficiencies expected to be above 70% in most circumstances. It should be noted that by using more than one hydraulic pump/motor, the overall hydraulic displacement of the apparatus can be changed by the control system by means of mechanically or hydraulically coupling the pump/motors to the drive shaft using a mechanical clutch or by hydraulically unloading on or more of the pump/motors. The overall mechanical and hydraulic efficiency of these pump/motors is typically greater than 90% over a range of operating speeds and pressure differentials across the pump/motors to ensure maximum overall efficiency of the system. The cost of fixed-displacement pump/motors is also much lower than variable-displacement pump/motors having the same maximum displacement. Further, fixed-displacement devices can achieve higher rotational speeds which allow high overall displacements and torque constants from a relatively small hydraulic device. Thus, the use of fixed-displacement pump/motors allows the present invention to be a cost-effective solution for recycling energy.

However, the present invention is not limited to the use of any specific number of fixed-displacement hydraulic units, as using more pump/motors may in some drive cycles further improve efficiency. Similar control theory applies to any number of fixed-displacement pump/motor units greater than one. Fixed-displacement pump/motors are used since, although variable units can provide stepless torque values throughout a range of speeds in both absorption and reapplication modes, the efficiencies can be low when modulating torque applied to the driveshaft. By selecting an appropriate combination of fixed displacement pump/motor units for providing the amount of driveshaft torque required by the driver, embodiments of the present invention generate high recovery efficiency at any speed.

The present invention uses a variable pre-charge algorithm to account for changing drive cycles and changing vehicle mass so that energy recovery is always achieved at a high efficiency. To accomplish this, the high- and low-pressure systems are slightly larger than those required for maximum efficiency at full load. By adjusting the amount of fluid remaining in the high-pressure accumulator after periods of acceleration, the pre-charge can practicably be adjusted. For example, a fifteen gallon accumulator having a gas pre-charge of 1850 psi may behave like a ten gallon accumulator having a 2775 psi pre-charge without changing the amount of nitrogen gas in the bladder. If, for example, five gallons of hydraulic fluid are pumped into a 15 gallon (gas volume) accumulator having an initial gas pressure of 1850 psi, the gas pressure and therefore the fluid pressure at the final state according to Boyle's ideal gas law will be 2775 psi. That is, $P1=1850$ psi, $V1=15$ gal., $V2=10$ gal., then $P2$ is 2775 psi. Since the deceleration rate or acceleration rate is proportional to the torque applied to the wheels and the vehicle mass, the value of the lowest amount of torque that can be applied to the drive shaft becomes important. If the fluid pressure in the accumulator is too high when braking is initiated, the driver will have more braking torque than needed and will not be able to effectively use the hydraulic energy recovery system as braking will be more vigorous than desired. Conversely, as will be described hereinbelow, if the initial fluid pressure is too low, the driver will have insufficient braking torque and will be required to use a mix of the torque supplied by the hydraulic energy recovery system and the foundation brakes of the vehicle. In either situation the maximum potential of the system is not being realized.

Thus, an initial fluid pressure of 1850 psi may provide the correct amount of torque to stop a 10,000 lbm vehicle according to the driver's commands and recover energy at a high rate. However, if the vehicle becomes 2000 lbm heavier, the initial fluid pressure of 1850 psi when the driver initiates a braking event may be inadequate to stop the vehicle. The present invention, therefore, continually monitors what acceleration effect the pump/motors provide at specific pressures and solves for the vehicle mass. In the situation where the vehicle becomes heavier during its operation, for example a bus picking up people, the electronic control system of the hydraulic energy recovery device requires more fluid to be stored in the high-pressure accumulator so that the pressure is higher when braking events are initiated. On successive stops, or until the control system detects that the vehicle mass has decreased, the apparatus will operate at higher pressures which causes the apparatus to have the same acceleration effect on vehicles independent of vehicle mass.

Therefore, if the vehicle driver depresses the accelerator pedal, an electronic control unit, to be discussed in greater detail hereinbelow, uses the pedal position to determine a requested torque value. The electronic control unit uses the instantaneous pressure values from high- and low-pressure accumulators to determine what the pressure differences between the inlet and the outlet ports of the hydraulic pump/motors will be. A matrix stored in the electronic control unit software contains the torque constants of each of the possible combinations of pump/motor units, as determined by the displacements of the chosen pumps and their fixed mechanical gear ratios to the driveshaft, as a look-up table. The electronic control unit converts the pedal position to a torque value requested by the driver, which is compared with the lookup table in the array. The electronic control unit then selects a combination of pump/motor units that have a torque constant that when multiplied by the difference in pressure across the high- and low-pressure accumulators will provide slightly less torque than what the driver is requesting such that the pump/motors which are then coupled to the drive-line are able to operate without the necessity of throttling. Testing was performed on selected proportional pressure control valves to ensure that if the motors are operated at 100% of the requested pressure, there would be little to no power loss across the control valves. In this manner, the pumps operate at their true un-throttled efficiency.

The accelerator position is monitored by the electronic control unit and, depending on the amount of energy that can be supplied by the hydraulic system, a modified signal is sent to the engine from the electronic control unit. Because the control system selects a pump combination that provides slightly less torque than the driver requests, the electronic control system uses the difference in torque between the torque the pump/motor units will deliver and that requested by the driver, the vehicle engine control unit generates a throttle signal for directing the engine to operate at a percentage of full power. The electronic control unit continuously monitors the change in vehicle speed with respect to time to determine the vehicle acceleration and, during driving, continuously compares the acceleration of the vehicle to the amount of torque that the electronic control unit is commanding from the engine and the hydraulic system. From known driving wheel diameters and the rear-end ratio for the vehicle, the software in the electronic control unit calculates a vehicle mass based on the acceleration that is achieved from a calculated torque value.

As stated hereinabove, for delivery vehicles and passenger vehicles, it is common to have large changes in mass throughout the vehicles route. Without compensating for these mass changes, the energy recovery will become very inefficient. The acceleration and deceleration limits are pre-programmed into the electronic control unit software, and used to adjust the minimum pressure of the high- and low-pressure accumulators. For example, if a city bus stops and boards 2000 lbm of people and their belongings, the software within the electronic control system will calculate the vehicle mass during the following regeneration cycles. Based on the real-time vehicle mass the electronic control unit determines what the minimum required torque should be for practical safe driving. If the mass increases, the electronic control unit will command higher pressure in the high-pressure accumulator after the next braking event. Therefore, if the vehicle is calculated to weigh 10,000 lbs, the electronic control unit will allow the multifunctional hydraulic manifold to apply flow to the hydraulic units until some minimum pressure (2200 psi, as an example) is reached in the high-pressure accumulator. If, during the next stop, the control system determines that the vehicle mass has increased to 12,000 lbm, the electronic control unit will command the multifunctional hydraulic manifold to cease motoring at (2600 psi) in the high-pressure accumulator. During the next braking event, the maximum torque constant available at the lowest high-pressure accumulator pressure value will be sufficiently high to maintain the same braking feel to the driver as when the vehicle weighed 2000 lbm less. Also, because the vehicle braking will build pressure from a higher initial value, the final pressure will also be higher, which allows the hydraulic system to apply more torque to the system during acceleration which further allows the percentage of engine torque to be less. This is important for maintaining a high energy recovery efficiency.

The components of embodiments of the present invention may be placed on a modular skid, which permits the entire hydraulic regenerator system to be installed in or removed from a vehicle as a unit, if required for maintenance and repair. The modular skid also allows the system to be fully commissioned outside a vehicle platform. Typically, minor modifications are required to the vehicle to interface to the hydraulic skid, which include sizing the driveshaft to interface with the Power Transfer Module, to be described hereinbelow, and replacement of the brake pedal as also discussed hereinbelow.

Figure 2:
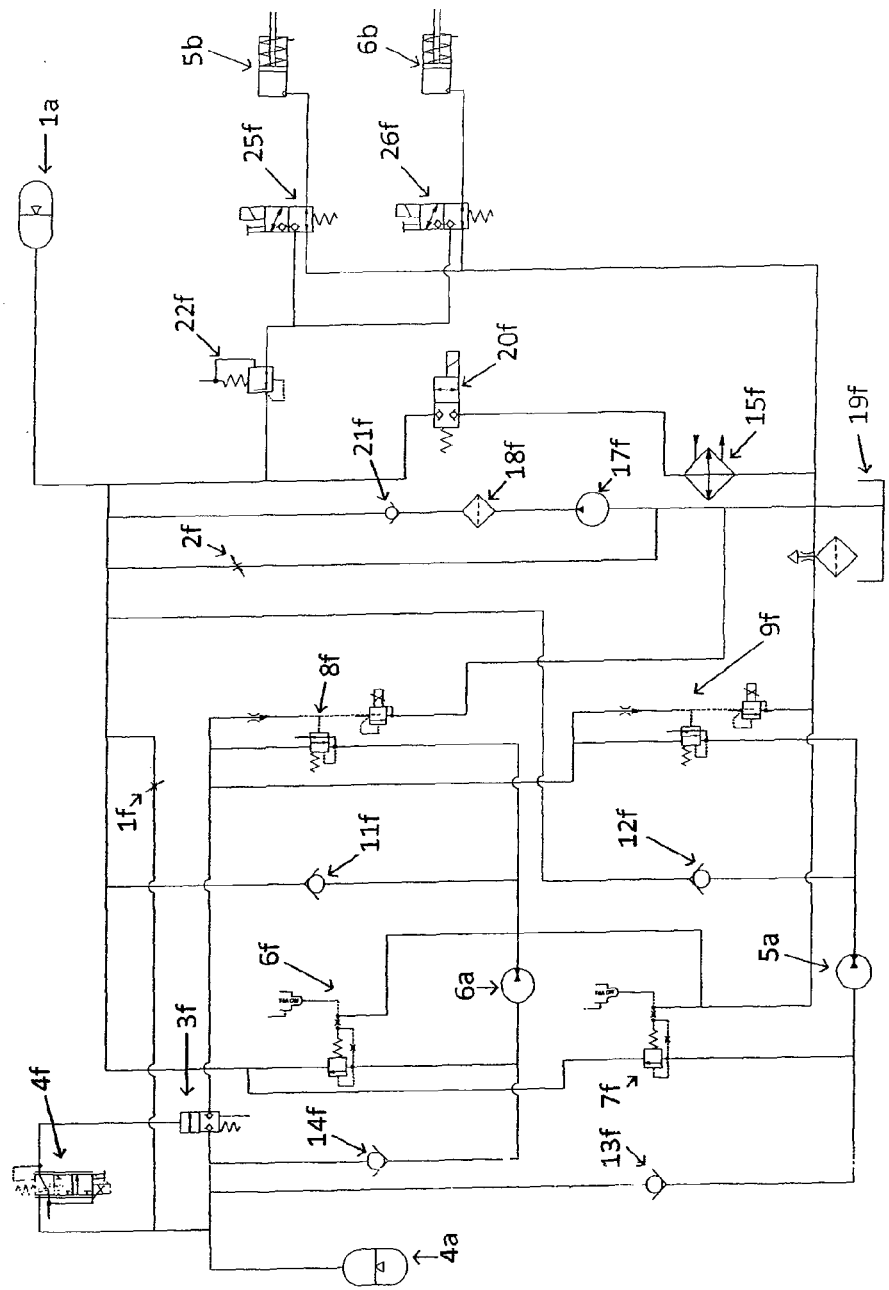
FIG. 2 is a schematic representation of the components of the multi-function hydraulic manifold of FIG. 1.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1, a schematic representation of an embodiment of the hydraulic regeneration apparatus of the present invention is illustrated. The components of an embodiment of the multi-function hydraulic manifold (reference character 3a of FIG. 1) are shown in FIG. 2 hereof. In FIG. 1, reference characters having the letter "a" represent hydraulic components; reference characters having the letter "b" represent mechanical power transfer components which are part of a component collectively referred to as the PTM (power transfer module), 30b; reference characters having the letter "c" represent components of the system microcontroller and associated drivers; and reference characters having the letter "d" represent components that are part of any vehicle for which embodiments of the present invention may be employed, for example, the components identified with "d" are common parts of modern automobiles. It should be noted that the present apparatus is supplementary to the existing vehicle drive-train; that is, it does not interfere with the normal operation of the vehicle drive-train.

In existing cars and trucks, rotational power is produced by prime mover 1d, such as an internal combustion engine, as an example, which transfers power through torque converter 2d to automatic transmission 3d, which adjusts the torque and speed ratio between its input rotation and its output rotation. The output rotation of automatic transmission 2d is mechanically affixed to driveshaft 4d, which transfers rotational power from the output of transmission 3d to differential 5d. Differential 5d in turn transfers rotational power to wheels 6d such that the vehicle moves forward or in reverse depending on the rotational direction of drive-shaft 4d. When the vehicle moves forward or backward, the wheels also transfer rotational power through the axles to differential 5d and from differential 5d to driveshaft 4d. Modern automatic transmissions are designed in such a way as to minimize the amount of rotational power that is absorbed by the transmission, and in turn the internal combustion engine 1d. This is typically accomplished by preventing backward power flow through the transmission to the engine through the torque converter. In unmodified vehicles, the rotational power of wheels 6d may be dissipated to slow the vehicle is by using disc or drum brakes which apply friction to a drum or disk which is rigidly fixed to wheels 6d. This is an effective way to slow or stop a vehicle's forward or reverse motion, but in terms of the prime mover that produced the power to accelerate the vehicle to some forward or backward speed, simply turning the vehicle's kinetic energy into heat energy through conventional braking systems is wasteful.

It is to be mentioned that when reference is made to monitoring pressure of various of the components of embodiments of the present hydraulic regeneration apparatus, such measurements are made using hydraulic pressure sensors known in the art.

As stated hereinabove, a purpose of embodiments of the present invention is to recover the kinetic energy of vehicle motion and to use whatever portion of the original kinetic energy that can be captured and stored for subsequent accelerations of the vehicle without the need of producing additional power by burning fuel. To achieve this objective, embodiments of the present invention operate in parallel to the vehicle's drive-train.

The manner in which driver inputs are reduced to commands directed to the multifunctional control manifold, and those system operations which generate commands affecting the vehicle wheels, will now be explained. A driver has essentially two means of input into the present hydraulic regeneration apparatus through the regeneration device's electronic control unit, 1c. To affect the torque at the wheels during braking, the vehicle's brake pedal is either modified or replaced. Similar to the accelerator pedal mentioned hereinabove, the brake pedal includes a portion of the travel at the top of the pedal stroke where its movement can be monitored, referred to as the deadband, such that the movement does not affect the operation of the vehicle's existing foundation brakes. That is, although such a deadband may be achieved in several ways, the deadband may have sufficient travel that there is good resolution for modulating the portion of braking demand that is to be met by the recovery system, but falling short of the situation where the normal operation of the foundation brakes are significantly affected or difficult to use. Vehicle dynamics and driver feedback generally permit up to an inch of movement in the deadband region. The deadband may also be such that at the end of its travel, the pedal is rigid and at least as mechanically strong as the unmodified pedal. For purposes of the present invention, the deadband travel may be sensed, 32c, either by a rotary or linear potentiometer or any other means that provides an output signal linearly proportional to the distance the pedal is pressed into the dead band. The pedal may have a mechanical spring that returns the pedal to the zero position when the driver's foot is removed from the pedal, and the maximum signal corresponds to the position of the pedal where the end of dead band travel is reached and further movement affects the foundation brakes of the vehicle, the actual position of the pedal being sensed by a potentiometer or other sensor which the electronic control unit samples at least ten times per second. This has been found to be an ample sampling rate for appropriate vehicle response. The electronic control unit correlates the measured pedal positions with a percentage of maximum braking torque that is safe for the system to provide.

It should also be mentioned that the apparatus described hereinabove permits the foundation brakes of the vehicle to be used at any given time. If the hydraulic regeneration system is not in use, the pedal functions largely the same as an unmodified pedal. If the brake is rapidly depressed, as in a panic stop, the controller interprets the rapidly changing brake signal as a dangerous event and prevents the hydraulic regeneration apparatus from acting such that the operator does not lose control of the vehicle. It should likewise be mentioned that it is simply required that the brake pedal to have a similar feel to a stock pedal while permitting the controller to detect the pedal position. For acceptable energy recovery efficiencies, the deadband region of brake travel should not affect the operation of the foundation brakes at all, while maintaining an identical feel to the remainder of the brake travel. This can be accomplished with electrical servo motors, mechanical springs electro hydraulically, or by some combination of such devices.

The upper limit of braking torque is adjustable through changes in the apparatus software, but has been found to be proportional to the product of vehicle mass and an upper limit of deceleration of about 0.2 g. Values significantly above this threshold deceleration values may cause the driver to lose control of the vehicle, and the foundation braking system is better suited for providing the braking function. The minimum amount of braking effort that the hydraulic regeneration system may provide is not dictated by the high-pressure accumulator pressure, but rather the commanded pressure setting of the braking pressure relief valve item (6f of FIG. 2). A requested braking torque value is obtained by multiplying the percentage of the pedal stroke that is sensed by the control system relative to the full travel in the deadband by a chosen value in the range between 0 and 0.2 g of deceleration. The deceleration value is then multiplied by the wheel diameter and the rear end ratio, and a required torque value that the hydraulic system should provide is calculated. Because the pump/motors are fixed displacement devices, the amount of torque that they can absorb is related to this displacement value and the potential difference in pressure between their inlet and outlet ports, when they are signaled to pump. The pump displacement is multiplied by the efficiency of the pump and geometric considerations to produce a value called the pump torque constant. This constant is then multiplied by the gear ratio between that pump's planet gear and the sun gear to produce a value called the pump's torque effect. The torque effect of each of the three pumps in the embodiment of the present invention illustrated is stored in look-up table array along with those torque effects derived from engaging any combination of two or three pumps at once.

The controller monitors the pressures in the high- and low-pressure accumulators during the approximate interval as the pedal position is read, and the controller software multiplies this pressure difference with the values in the array of torque effect constants to determine what torque effect any one pump or any combination of the three would have on the vehicle driveline. The pedal position converted to a requested torque variable is then compared with the values in the array to determine which pump or combination of pumps will provide the closest amount of torque to that requested by the driver's depressing the brake pedal. The system electronic control unit then commands the appropriate clutches which couple the chosen pumps to engage the drive line. Once the clutches engage and the pumps begin rotating they absorb power by drawing fluid from the low-pressure accumulator and pump it into the high-pressure accumulator where the fluid compresses the gas in the bladder and stores energy. If the driver requests less braking than the minimum that the system can provide, braking may be done hydraulically, but braking pressure relief valves 6f and/or 7f of FIG. 2 are adjusted to a pressure setting that when multiplied by the lowest pump/motor torque effect constant, the resultant torque corresponds to that requested by the driver. In the situation where the brake pressure relief valves are set to a pressure value lower than the high pressure accumulator value, all of the pressure moved by the pump will return to the inlet of the pump and no energy will be stored although the braking effort can still be controlled. In those situations where the driver requests very little braking torque or where the requested torque is greater than what is safe to recover where vehicle control and dynamics are concerned, energy is not recovered. Another aspect of embodiments of the present invention is that pump speed may be limited by the software in the controller. The pump speeds may be monitored by any conventional means for determining rotational shaft speed. Pump/motors should not be operated at higher than their rated speeds to avoid damage thereto. If it is impractical to directly monitor the pump/motor speed, it may be deduced from the overall speed of the vehicle.

As described hereinabove, the other input the driver has is the accelerator pedal. This pedal does not have a dead band, but does require servo-control of the throttle opening. In many modern vehicles this is the case where the gas pedal sends a signal to the engine control unit which commands a servo-motor fixed to the throttle opening valve of the engine to open proportionately to the driver's accelerator pedal position. In the present invention, the signal wires that relay accelerator pedal position, 34c, to engine control unit are redirected to and monitored by the hydraulic energy recovery system control unit, and separate output lines from the hydraulic energy recovery system control unit are directed to the engine control unit which directs the throttle opening servo to move to the commanded position. Beyond this, the accelerator pedal position is used in the same way as the modified brake pedal to control the amount of power the engine is producing and also how much power to be added by the hydraulic energy recovery system. In this situation the accelerator pedal position correlates to zero torque on the driveshaft when the pedal is in the zero position and maximum torque when the pedal is depressed fully. The maximum amount of torque that is determined by the amount of torque that the engine can direct to the drive-shaft at full power in whatever gear is selected. The hydraulic energy regeneration system's electronic control unit 1c constantly monitors the vehicle's CAN (controller area network) bus, 36d, and determines the current gear selection according the appropriate sample rate. Therefore, when a driver depresses the accelerator, the electronic control unit references the same array as in the braking case and again multiplies that array by the difference in pressure between the low pressure and high pressure accumulators. Again, depending on how much torque the driver is requesting for acceleration the appropriate combination of pump/motors is selected. The appropriate motor pressure control valves (8f and 9f of FIG. 2) corresponding to the pump/motor units that are selected are directed to increase the inlet pressure to those pump/motor units as the clutches to those corresponding units are engaged.

In both the accelerating and braking cases, if the requested torque values change, the control system continuously seeks a better combination of pumps to use. However, some amount of pedal travel is allowed before adjusting the combination for the sake of driveability and component wear.

Embodiments of the present invention have a drive-home failure mode safety feature, such that if there is a major failure of the energy recovery system, the system can be deactivated and the vehicle will operate in a normal fashion without the regeneration function. In this situation dog clutch (8b of FIG. 1), or a similar device, may be de-activated and all of the components of the embodiment of the present invention shown therein will be completely isolated from the existing vehicle drive train. Three levels of protection against undesired acceleration are also included in embodiments of the present invention. First, in order for a pump/motor to add power to the vehicle drive-line, its respective clutch must be directed to the on condition. The valves which control clutch engagement are normally-closed valves, such that if they lose power, either hydraulic or electric, they will be off or in a low-energy state, and therefore will not couple the pump/motor to its respective planet gear. The second level of protection is the high-pressure accumulator on/off valve (3f of FIG. 2), which is also a normally-closed valve such that a control signal is required for it to open. In a power failure mode, it will not be possible for this valve to open. The third layer of protection against unwanted movement includes the motoring pressure control valves. If the clutches are frozen in the engaged condition, and the high-pressure on/off valve fails in the open condition, the default state of the motoring pressure control valves (8f and 9f of FIG. 2) is the minimum pressure setting or zero pressure. This does not permit pressure to be applied to the inlet of the pump/motors, which would cause them to motor. The same systems prevent undesirable braking torque form being applied to the system. Error checking within the control system prevents erroneous throttle and brake signals at all times.

In another embodiment of the invention it is possible to mechanically isolate the apparatus from the drive train by means of dog clutch 8b. Clutch members 5b and 6b are not necessary and may be eliminated. When the sun gear is rotating pump/motors 5a and 6a are also rotating with their braking effects controlled by the braking pressure relief valves in the multifunctional hydraulic manifold. The dog clutch may decouple the sun gear in the power transfer module from the drive shaft such that only the drive shaft spins when the dog clutch is disengaged and none of the components of the regeneration apparatus move. This is done to reduce gear losses when the vehicle is driving and the hydraulic regeneration apparatus is not actively working. The dog clutch may be engaged with a synchronizer plate such that the synchronizer plate speed matches the sun gear to the driveshaft before and load is placed on the planet gears. The dog clutch is only engaged when the system is being used for braking or accelerating and, during over the road operation of the vehicle when the regeneration apparatus is not being used, the regeneration apparatus is decoupled from the drive line by the dog clutch to avoid introducing losses into the overall system.

As mentioned hereinabove, auxiliary gas bottle, 38a, auxiliary hydraulic pump, 40a, clutch, 41a, for engaging and disengaging hydraulic pump 40a to engine 1d, and turbo-powered pump, 42a, may be added to embodiments of the present hydraulic regeneration apparatus to improve the efficiency thereof.

Figure 3:
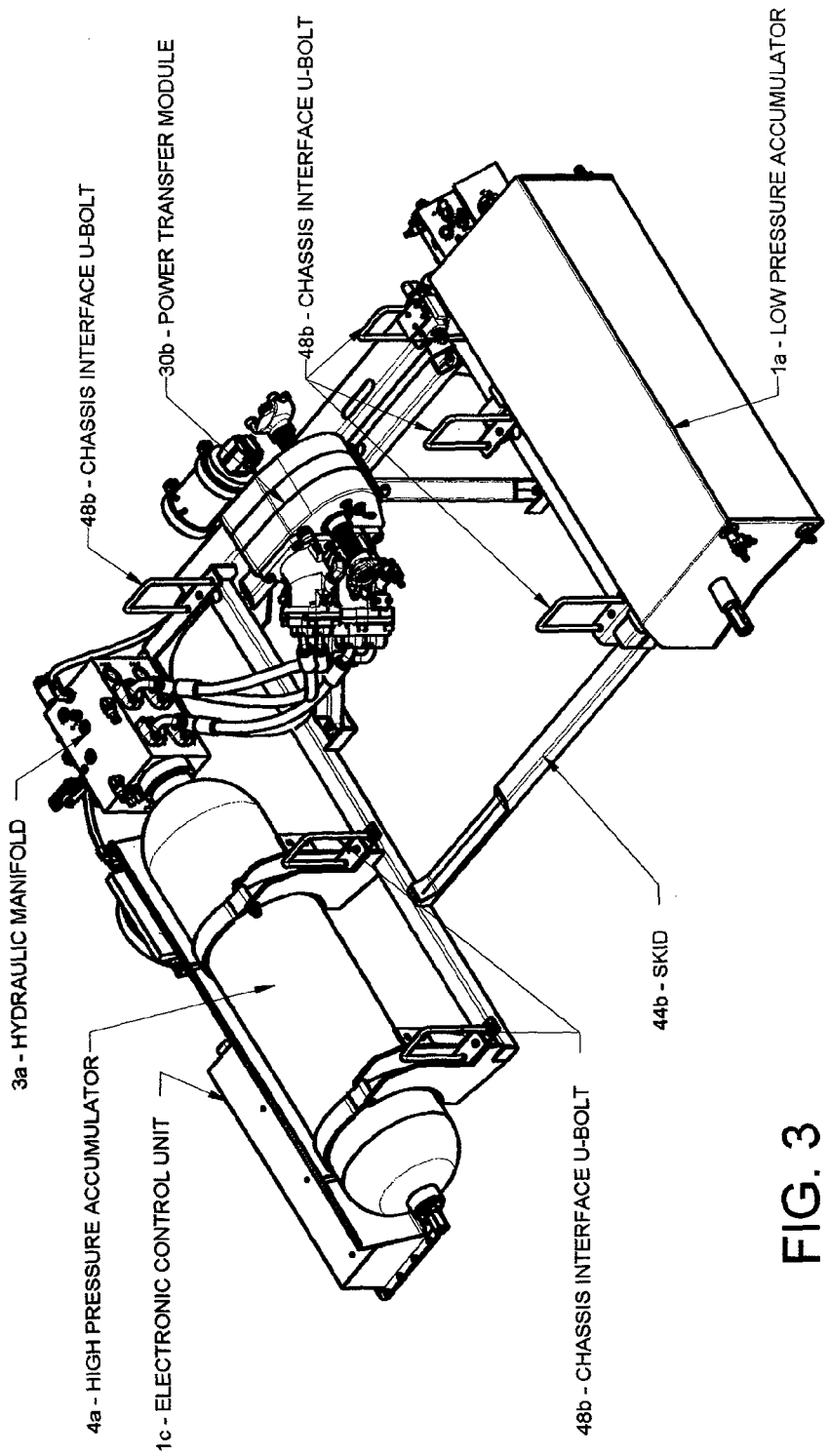
FIG. 3 is a schematic representation of perspective top view of a skid for holding the components of an embodiment of the hydraulic regeneration apparatus of the present invention for installation as a system in a vehicle, or removal therefrom.

As illustrated in FIG. 3, the components of embodiments of the present hydraulic regeneration system may be affixed to skid, 44b, which permits the apparatus to be readily installed on a vehicle. The skid comprises framework, 46b, that provides mounting points for all of the components of the hydraulic regeneration apparatus. The skid may be added or removed from a vehicle, thereby making the hydraulic regeneration device a bolt on retrofit system for vehicles. The skid also allows the system to be fully commissioned outside a vehicle platform. This is helpful where the apparatus is used without vehicles and, in the situation where it is used for a vehicle, the system can be commissioned and tested off of the vehicle before installation. It is of note that all of the hose routing, wiring, and other assembly is complete on the skid and separate from the vehicle.

Figure 4:
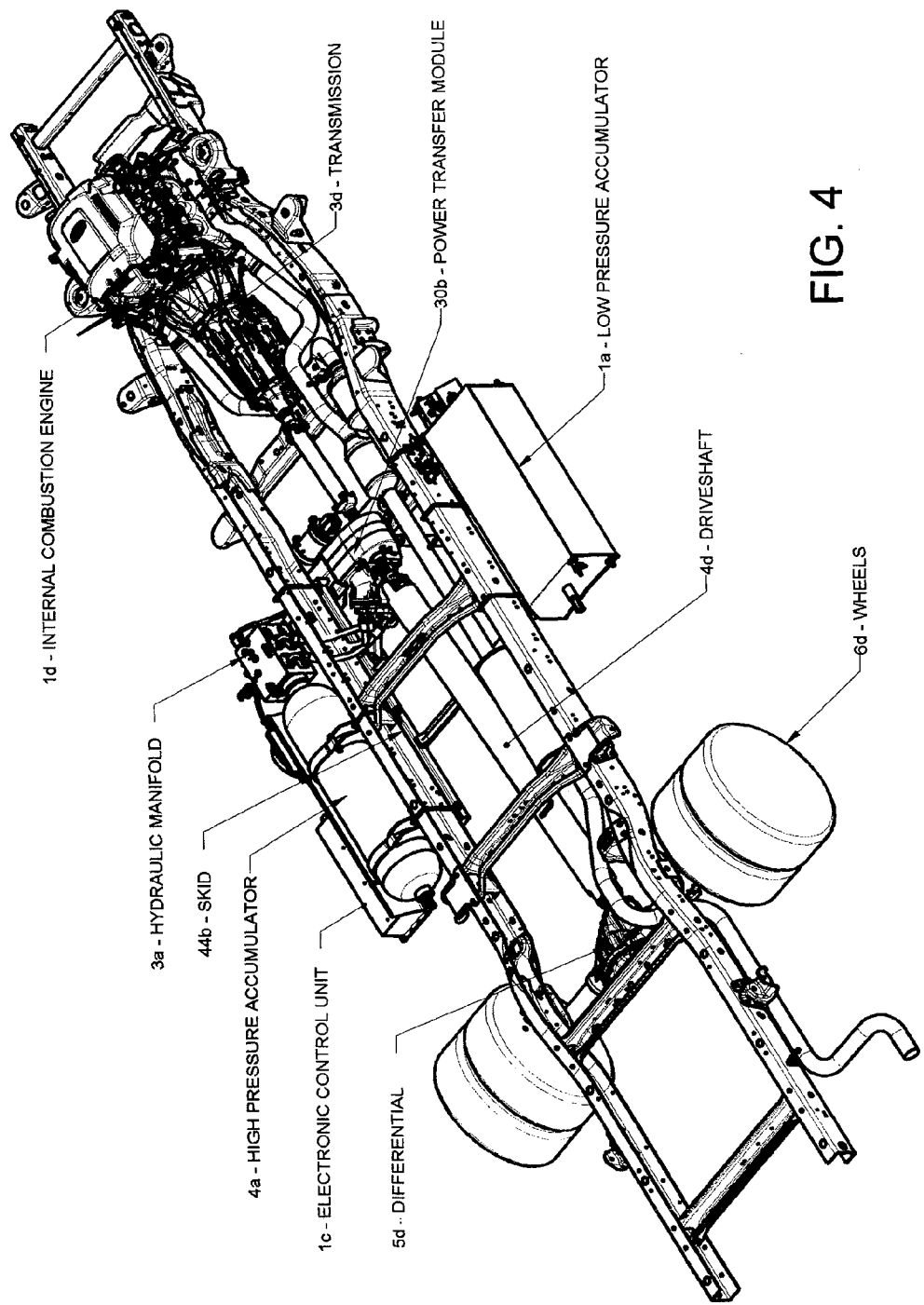
FIG. 4 is a schematic representation of a perspective top view of the skid shown in FIG. 3 hereof installed in a vehicle.

FIG. 4 shows the skid installed on a vehicle chassis. Typically, minor modifications are required to the vehicle to interface to the hydraulic skid, which may include sizing the driveshaft to interface with PTM 30b and replacement of the brake pedal as discussed hereinbelow. The skid configuration, which is adapted to the particular chassis of the motor vehicle, allows for easy installation of the hydraulic regeneration system into a vehicle. The skid may be secured to the vehicle chassis using U-bolts, 48b, for minimal modification to the stock chassis. In some situations where a U-bolt is not able to be installed due to a vehicle interference, the skid may be bolted directly to the chassis. The present skid also permits the hydraulic regeneration system to be easily and quickly removed if required for maintenance and repair. This allows for a minimal customer downtime in case of a system failure, since the vehicle may be readily reconfigured in its original form.

Having generally described embodiments of the present invention, the following EXAMPLES provide additional details.

Example 1

Embodiments of the present invention may operate in one of three modes. In the first mode, the hydraulic components of the system are completely decoupled from the existing driveline through hydraulically activated clutches 5b and 6b. In this mode the only components in the system that are active are sun gear 1b and the two planetary gears 2b and 4b. In the configuration shown, any time that the drive shaft 4d is rotating, sun gear 1b and planet gears 2b and 4b will also rotate. If included, the high torque, dog-clutch 8b decouples the mechanical components of the system from the existing drive-line in the event of a failure or in instances where long over the road travel is required without stops and starts which limits the effectiveness of the present invention. The mode in which only the sun gear and planet gears are turning is referred to as hydraulic idle mode. If clutches 5b and 6b are engaged, the hydraulic pump/motors 5a and 6a will be rotating as well. Further, if the apparatus is configured with a dog clutch instead of the two separate clutches 5b and 6b, the pump/motors 5a and 6a will also rotate any time the dog clutch is engaged. In order to achieve a hydraulic neutral state, the brake pressure relief valves 6f and 7f coupled to the outlet of both pump motors will need to be set to the minimum setting by the controller 1c. The outlet of the brake pressure relief valves 6f and 7f is coupled to the low-pressure accumulator 1a and therefore tied to the inlets of the hydraulic pump/motors so in effect there is no change in pressure across the pump/motors and they will not impart torque to the system.

Example 2

The second mode, referred to as the braking mode, occurs when one pump/motor unit or some combination of all of the pump/motor units absorbs power transferred from wheels 6d through differential 5d through driveshaft 4d to sun gear 1b. When a driver depresses the brake pedal, the system's electronic control unit 1c measures the brake pedal position and determines how much deceleration the driver is requesting. That deceleration value is converted to a desired torque value calculated by measuring the difference in pressure between low pressure accumulator 1a and high pressure accumulator 4a. Control system 1c then determines which pump/motor 5a or 6a through its fixed mechanical gear ratio or which combination of pumps/motors 5a and/or 6a through their respective mechanical gear ratios, will provide approximately the negative braking torque that the driver is requesting. Once the appropriate selection has been made, the system's electronic control unit 1c commands multi-functional hydraulic manifold 3a to engage appropriate clutches 5b and or 6b, and begins turning appropriate pump/motors 5a and/or 6a. In the situation where a dog clutch is used in place of the separate planet clutches, the braking pressure relief valves 6f must be used to unload the hydraulic motors that are not being used to provide immediate braking effort. In this case, the braking pressure relief valves are set to their lowest possible setting so that the pressure difference between the inlet and the outlet of the pump/motors is minimal and therefore their torque effect on the drive shaft is minimal. The pump/motors are hydraulically coupled to high- and low-pressure accumulators 1a and 4a through multi-functional hydraulic manifold 3a.

FIG. 2 shows the hydraulic circuitry that comprises multi-functional hydraulic manifold 3a of FIG. 1, hereof. When system electronic control system 1c chooses the correct combination of pumps, it opens the appropriate clutch actuation valves 25f and/or 26f of FIG. 2.

The overall functionality of the hydraulic circuitry that permits the clutches to engage will now be explained. Clutch units 5b and 6b are normally open clutches which engage when pressurized with oil. The clutches require only 150 psi in order to activate and carry the maximum allowable torque. Therefore, fluid from the low-pressure accumulator is fed through pressure reducing/relieving valve 22f in order to regulate the oil pressure to the clutches and avoid damage thereto. The outlet of pressure reducing/relieving valve 22f has a fluid connection to the clutch control valves 25f and 26f. Therefore, there is always pressure regulated oil at the inlets of valves 25f and 26f. When the electronic control system commands a clutch to be activated, it opens valve 25f or 26f which supplies clutches 5b or 6b with pressurized oil, respectively, and the proper clutch engages.

When the associated clutch is engaged, the hydraulic pump/motor unit acts like a pump by default as a result of the manner in which the pump/motors are connected. Any one of the pump/motors 5a or 6a, if engaged with their respective planet gears 2b or 4b by clutches 5b or 6b, will draw fluid from low-pressure accumulator 1a of FIG. 1 through its respective inlet check valve 11f or 12f of FIG. 2. The pump/motor then pushes fluid through any of outlet check valves 13f or 14f. Inlet and outlet check valves allow any combination of pump/motors to be used in either the pumping or motoring condition without affecting the operation of the other units. The pump/motor outlets are directed to two valves for each pump/motor inside the multi-function hydraulic manifold 3a, 6f, 7f, 13f, and 14f of FIG. 2. Valves 6f and 7f are the brake pressure relief valves, and valves 13f and 14f are the outlet check valves for pump/motors 5a and 6a, respectively, in FIG. 2. Once fluid passes through outlet check valves 13f or 14f, it is trapped or stored in the high-pressure accumulator 4a. If fluid goes through high-pressure by-pass valve 6f or 7f, it returns to the low-pressure accumulator 1a. The pressure setting of the pilot stage of high-pressure by-pass valves 6f and 7f ultimately controls the pressure at the pump outlets, and therefore controls the braking effort that the pump/motors will produce if they are pumping at a pressure value less than the high-pressure accumulator fluid pressure. Electronic control system 1c continuously monitors the fluid pressure in high-pressure accumulator 4a and the pressure at the outlet of pump/motor units 5a and 6a.

In this manner, the torque contribution of the engaged pump/motor units is controlled. Whenever possible, electronic control system 1c chooses a combination of pump/motors for braking that will meet the driver's demand, while ensuring that the fluid that the pump is moving is transferred from low-pressure accumulator 1a to high-pressure accumulator 4a. Control system 1c chooses the pump or combination of pumps that will provide slightly less braking effort than that demanded by the driver based on the fluid pressure in high- and low-pressure accumulators 4a and 1a, respectively. High-pressure bypass valves 6f and 7f are used only when necessary to allow the hydraulic system to do very light braking when it is not practical to direct flow into high-pressure accumulator 4a. High-pressure bypass valves 6f and 7f are also briefly employed if control system 1c requires a different pump/motor selection. In this situation, high-pressure bypass valves 6f and 7f, which ultimately controls the torque contribution of the hydraulic system during braking, can be used to match the torque contribution of two different combinations of pumps. All other valves in the system remain in their default state during braking.

Example 3

The third system mode is the motoring mode, where the fluid flows from high-pressure accumulator 4a to low pressure accumulator 1a and applies positive accelerating torque to the vehicle drive-shaft. By introducing high-pressure fluid to the inlets of the pump/motor units, the units produce torque which is transferred from pump/motor units 5a and/or 6a through hydraulically actuated clutches 5b and/or 6b to planet gears 2b and 4b, respectively, to sun gear 1b through driveshaft 4d to differential 5d, and finally to wheels 6d. In this mode of operation, system electronic control unit 1c again monitors the fluid pressure difference between high-pressure accumulator 4a of FIG. 1 and low-pressure accumulator 1a of FIG. 1. Control system 1c calculates the amount of available energy from the pressure difference between the high- and low-pressure accumulators, and which pump/motor combination may be used to meet the driver's demand. In this mode, control system 1c continuously monitors the brake and accelerator pedal positions. If system electronic control unit 1c detects any brake pedal position the system will be locked out of motoring mode.

If the driver simultaneously depresses the accelerator pedal and the brake pedal, the system will enter the motoring mode. In this situation, system electronic controls system 1c uses the accelerator pedal position to calculate a desired torque value, and evaluates how much energy is available from the hydraulic system based on the difference pressure between the high-pressure and low-pressure accumulators. Control system 1c also continuously monitors the rotational speed of the pump/motor units to calculate an approximate efficiency value for the pump/motor units and correct the available torque value since the total mechanical and hydraulic efficiency of the fixed-displacement pump/motors is largely determined by speed. The appropriate combination of pump/motors needed to meet the torque demand set by the driver is then selected. Control system 1c opens high-pressure on/off pilot stage valve 4f. This places pilot pressure on high-pressure on/off main stage valve 3f and causes it to open, which allows high-pressure fluid to move to motoring pressure control valves 8f and 9f. Motoring pressure control valves are comprised of a pressure compensated orifice, a pilot stage and a main stage. Because the pressure difference between pump inlet and outlet determines the amount of positive accelerating torque the pump/motor unit can provide, this pressure difference is controlled using the motoring pressure control valves. Inlet check valves 11f and 12f prevent high-pressure fluid from going from the outlet of motoring pressure control valves 8f and 9f back to the low-pressure accumulator 1a. The inlet check valves allow fluid to enter the inlet of the pump/motors 5a and 6a when the pump/motors are working in the braking mode. Once high-pressure on/off main stage valve has opened, the motoring pressure control valves are adjusted to a pressure slightly higher than the low-pressure accumulator pressure. High-pressure by-pass valve 6f is also adjusted to some pressure slightly higher than the setting of the motoring pressure control valves of the selected pump/motor units. This ensures that the motors do not rotate, but that low-pressure inlet check valves 11f and 12f are closed. At this point, control system 1c commands appropriate clutch on/off valves 25f and/or 26f on which clutches the appropriate pump/motor units to their respective planet gears. The control system makes the pump/motor selection such that slightly less than the desired torque requested by the driver is supplied by the hydraulic system.

The remaining torque is supplied by vehicle prime mover 1d of FIG. 1. This is done so that the motor units and the vehicle's engine can be operated at optimum efficiency. Whenever possible, then, the motoring pressure control valves are used to smooth out motor engagement and changing pump/motor combinations during motoring. System electronic control unit 1c uses an algorithm to blend engine power with the power provided by the hydraulic system. As the high-pressure fluid in the high-pressure accumulator is depleted, system electronic control unit 1c commands the vehicle engine to add more power by running the throttle signal wires from the accelerator pedal into system electronic control unit 1c which has separate lines that send the signal onto the engine control unit supplied with the vehicle. All of the error checking is left intact so that the engine cannot be supplied with erroneous controls signals. If the hydraulic unit is capable of supplying all of the requested power that the driver demands, the engine will idle until the high-pressure fluid supply has been depleted and power needs to be supplemented by the prime-mover.

Using these three modes the overall present invention is efficient and smooth in recovering a vehicles kinetic energy and reapplying it to the system.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Hydraulic regeneration apparatus for a motor vehicle having an engine, a transmission and a drive shaft, said regeneration apparatus comprising: at least two fixed displacement hydraulic pump/motors; a sun gear rotatably disposed between said transmission and said driveshaft; a first planet gear in meshing communication with said sun gear; a second planet gear in meshing communication with said sun gear; at least two hydraulic clutch members, a first hydraulic clutch member of said at least two clutch members for rotatably engaging a first of said at least two pump/motors with said first planet gear, and a second hydraulic clutch of said at least two clutch members for engaging a second of said at least two pump/motors with said second planet gear; a low-pressure hydraulic accumulator containing pressurized fluid; a high-pressure hydraulic accumulator containing pressurized fluid; a multifunction hydraulic manifold for placing said first pump/motor in fluid communication with said low-pressure accumulator and said high-pressure accumulator, and for placing the second pump/motor in fluid communication with said low-pressure accumulator and said high-pressure accumulator, for controlling the output torque of said first pump/motor and said second pump/motor to said driveshaft, and for controlling the torque absorbed by said first pump/motor and said second pump motor from said driveshaft; a vehicle throttle position sensor; a brake pedal position sensor; and an electronic control system for receiving pressure information from said high-pressure accumulator and low-pressure accumulator, brake pedal position information, and throttle position information, and for controlling said multi-function hydraulic manifold.

2. The hydraulic regeneration apparatus of claim 1, wherein said electronic control system directs recovery of kinetic energy from said driveshaft from vehicle motion to be stored as an increased pressure of the fluid in said high-pressure accumulator, and the availability of the recovered energy in said high-pressure accumulator to said driveshaft.

3. The hydraulic regeneration apparatus of claim 1, wherein said regeneration apparatus functions in parallel to said drive-train of said motor vehicle, whereby foundation brakes of said motor vehicle provide braking if said hydraulic regeneration apparatus is not active.

4. The hydraulic regeneration apparatus of claim 1, wherein said multifunction hydraulic manifold comprises at least two hydraulic fluid circuits, each of said at least two hydraulic circuits comprising at least two check valves and at least two pressure control valves, for directing said at least two pump/motors to pump fluid from said low-pressure accumulator to said high-pressure accumulator, or to receive fluid from said high-pressure accumulator to power said at least two pump/motors to supply torque to said driveshaft.

5. The hydraulic regeneration apparatus of claim 1, wherein said multifunction hydraulic manifold provides hydraulic fluid to said first clutch of said at least two hydraulic clutch members and provides hydraulic fluid to said second clutch of said at least two hydraulic clutch members.

6. The hydraulic regeneration apparatus of claim 1, further comprising a dog clutch for mechanically isolating said sun gear from said driveshaft; and a synchronizer plate for matching the speed of rotation of said sun gear to the speed of rotation of said driveshaft.

7. The hydraulic regeneration apparatus of claim 1, further comprising an auxiliary gas bottle in gaseous communication with said high-pressure accumulator.

8. The hydraulic regeneration apparatus of claim 1, further comprising a first normally closed valve through which hydraulic fluid is supplied to cause engagement of said first hydraulic clutch member; and a second normally closed valve through which hydraulic fluid is supplied to cause engagement of said first hydraulic clutch member.

9. The hydraulic regeneration apparatus of claim 1, further comprising a normally closed valve through which hydraulic fluid is supplied to and exits from said high-pressure accumulator.

10. The hydraulic regeneration apparatus of claim 1, further comprising a skid to which said regeneration apparatus is affixed, said skid being adapted to be reversibly installed on said motor vehicle.

11. The hydraulic regeneration apparatus of claim 1, further comprising an auxiliary hydraulic pump; and a clutch member for engaging and disengaging said auxiliary hydraulic pump to said engine of said motor vehicle for moving hydraulic fluid from said low-pressure accumulator to said high-pressure accumulator.

12. The hydraulic regeneration apparatus of claim 1 further comprising a turbo-driven pump for utilizing waste heat from said engine for moving hydraulic fluid from said low-pressure accumulator to said high-pressure accumulator.

13. Hydraulic regeneration apparatus for a motor vehicle having an engine, a transmission and a drive shaft, said regeneration apparatus comprising: at least two fixed displacement hydraulic pump/motors; a sun gear rotatably disposed between said transmission and said driveshaft; a dog clutch for mechanically isolating said sun gear from said driveshaft; a synchronizer plate for matching the speed of rotation of said sun gear to the speed of rotation of said driveshaft; a first planet gear in meshing communication with said sun gear for rotatably engaging a first of said at least two pump/motors; a second planet gear in meshing communication with said sun gear for rotatably engaging a second of said at least two pump/motors; a low-pressure hydraulic accumulator containing pressurized fluid; a high-pressure hydraulic accumulator containing pressurized fluid; a multifunction hydraulic manifold for placing said first pump/motor in fluid communication with said low-pressure accumulator and said high-pressure accumulator, and for placing the second pump/motor in fluid communication with said low-pressure accumulator and said high-pressure accumulator, for controlling the output torque of said first pump/motor and said second pump/motor to said driveshaft, and for controlling the torque absorbed by said first pump/motor and said second pump motor from said driveshaft; a vehicle throttle position sensor; a brake pedal position sensor; and an electronic control for receiving pressure information from said high-pressure accumulator and low-pressure accumulator, brake pedal position information, and throttle position information, and for controlling said multi-function hydraulic manifold.

14. The hydraulic regeneration apparatus of claim 13, wherein said electronic control system directs recovery of kinetic energy from said driveshaft from vehicle motion to be stored as an increased pressure of the fluid in said high-pressure accumulator, and the availability of the recovered energy in said high-pressure accumulator to said driveshaft.

15. The hydraulic regeneration apparatus of claim 13, wherein said regeneration apparatus functions in parallel to said drive-train of said motor vehicle, whereby foundation brakes of said motor vehicle provide braking if said hydraulic regeneration apparatus is not active.

16. The hydraulic regeneration apparatus of claim 13, wherein said multifunction hydraulic manifold comprises at least two hydraulic fluid circuits, each of said at least two hydraulic circuits comprising at least two first check valves and at least two first pressure control valves, for engaging said at least two pump/motors to pump fluid from said low-pressure accumulator to said high-pressure accumulator, or to receive fluid from said high-pressure accumulator to power said at least two pump/motors to supply torque to said driveshaft.

17. The hydraulic regeneration apparatus of claim 13, further comprising an auxiliary gas bottle in gaseous communication with said high-pressure accumulator.

18. The hydraulic regeneration apparatus of claim 13, further comprising a first normally closed valve through which hydraulic fluid is supplied to cause engagement of said first hydraulic clutch member; and a second normally closed valve through which hydraulic fluid is supplied to cause engagement of said first hydraulic clutch member.

19. The hydraulic regeneration apparatus of claim 13, further comprising a normally closed valve through which hydraulic fluid is supplied to and exits from said high-pressure accumulator.

20. The hydraulic regeneration apparatus of claim 13, further comprising a skid to which said regeneration apparatus is affixed, said skid being adapted to be reversibly installed on said motor vehicle.

21. The hydraulic regeneration apparatus of claim 13, further comprising an auxiliary hydraulic pump; and a clutch member for engaging and disengaging said auxiliary hydraulic pump to said engine of said motor vehicle for moving hydraulic fluid from said low-pressure accumulator to said high-pressure accumulator.

22. The hydraulic regeneration apparatus of claim 13, further comprising a turbo-driven pump for utilizing waste heat from said engine for moving hydraulic fluid from said low-pressure accumulator to said high-pressure accumulator.

\* \* \* \* \*